United States Patent [19]

Costello

[11] 4,084,079
[45] Apr. 11, 1978

[54] ELECTRICAL VAPORIZER DEVICE
[75] Inventor: Hal F. Costello, Toledo, Ohio
[73] Assignee: Coswell Products, Inc., Toledo, Ohio
[21] Appl. No.: 810,958
[22] Filed: Jun. 29, 1977
[51] Int. Cl.² ............................................. F22B 1/28
[52] U.S. Cl. .................................. 219/271; 219/275; 219/276
[58] Field of Search ............................ 219/271–276; 21/117, 119

[56] References Cited
U.S. PATENT DOCUMENTS

| 1,144,508 | 6/1915 | Taylor, Jr. | 219/275 |
| 2,931,880 | 4/1960 | Yaffe | 219/271 |
| 3,748,438 | 7/1973 | Costello | 219/271 |
| 3,902,044 | 8/1975 | Doyle et al. | 219/275 X |

Primary Examiner—C. L. Albritton
Attorney, Agent, or Firm—Malcolm W. Fraser

[57] ABSTRACT

An electrically heated vaporizer having a pair of prongs to be plugged into a wall socket for vaporizing a chemically treated diffusable tablet for deodorizing, disinfecting, perfuming or otherwise treating air of a room, is formed of a hollow dome-like casing suitably foraminous so that air currents induced by a heater pass about the tablet to effect diffusion thereof. The casing is separated into two compartments by a shelf in the form of a row of laterally spaced pins or tines. On the under side of such shelf is an electrical heater for inducing the air currents, air inlet ports being on one side of the shelf and air outlet ports on the other side. The electrical heater is carried by a back plate which has hook-like catches adapted to snap into edges of the air ports for securely holding the parts in assembled relation. Cooperative locators insure proper positioning of the back plate and casing.

2 Claims, 2 Drawing Figures

ELECTRICAL VAPORIZER DEVICE

INCORPORATION BY REFERENCE

There is incorporated in this specification by reference the following United States patents of H. F. Costello:

U.S. Pat. No. 2,513,919, dated July 4, 1950 and entitled VAPORIZER;

U.S. Pat. No. 3,748,438, dated July 24, 1973, and entitled VAPORIZER DEVICE.

SUMMARY OF THE INVENTION

The vaporizer, according to this application, is similar to that disclosed in the above mentioned U.S. patents and incorporated by reference in this application. Such vaporizer has been widely used for many years, but it has been found that the partition separating the inside of the dome-like body or casing into upper and lower compartments has been too troublesome and expensive. Additionally, the holes through the partition have not provided as free a flow of air as desired.

According to this invention, the shelf or partition which divides the inside of the vaporizer into two compartments is in the form of integral tines or pins molded into the casing. These tines or pins are very small in diameter, and are spaced a substantial distance from each other so that a free flow of air is made possible. The spacing between the tines is such as not to affect adversely the position of the chemically treated tablet thereon. Additionally, instead of securing the back casing member to the main body by screws, as in previous forms, integral spring hooks are formed on the back plate so that it can be snapped into place securely almost instantaneously. Cooperating locator devices on the two parts insure the proper assembly.

DETAILED DESCRIPTION OF THE PREFERRED EMBODIMENT

Figure 1:
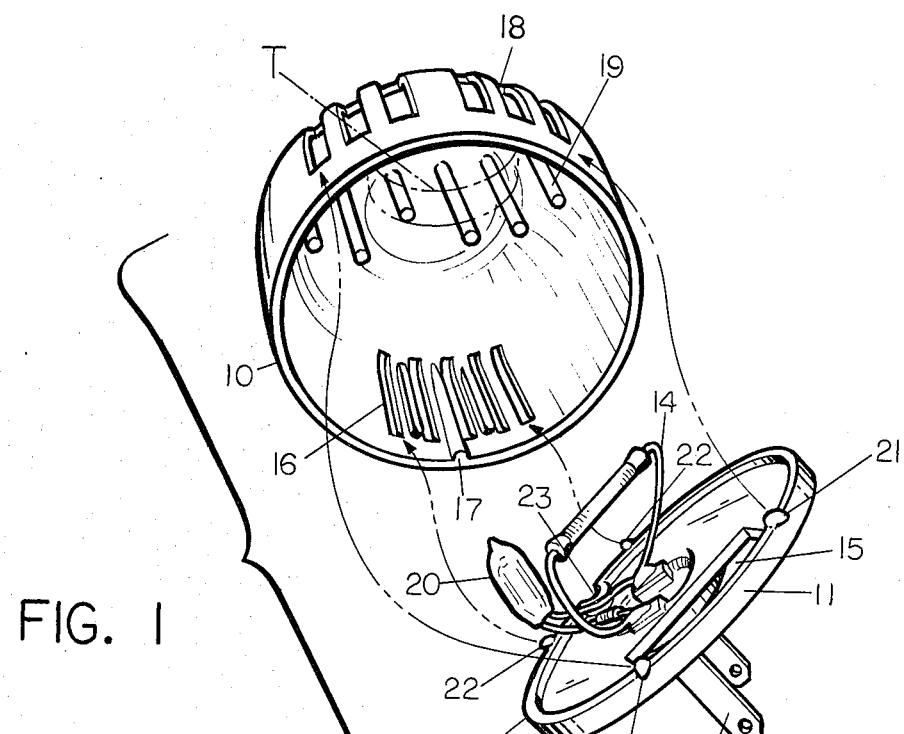
FIG. 1 is a composite perspective view of a dome-like body or casing, and the cover plate constituting the electrical vaporizer device.

The illustrated embodiment of the invention comprises a hollow body or casing 10 of dome shape which is closed at one end and open at the other. The open end of the casing 10 is closed by a cover plate or back casing member, 11 which has a flange portion 12 fitting snugly inside the casing. The casing and back member are formed of molded plastic, such as polycarbonate marketed under the trademark "Lexan".

The cover plate, or back casing member, 11 is provided on the outside with a pair of prongs 13 for electrical connection to a wall outlet, as will be readily understood. The prongs 13 are arranged at an inclined angle with respect to the vertical center of the body or casing 10 in position of use. The arrangement and importance of this arrangement of the prongs is fully described in the referenced U.S. Pat. No. 2,513,919.

On the inner side of the back casing member 11 is an electrical resistance type heater 14, the ends of which are connected respectively to the prongs 13 by suitable wires. Arranged above the heater 14 in the back casing member is an elongate access hole 15, through which a chemically treated tablet can be inserted and heated by the heater 14.

Formed in the lower portion of the dome-like casing 10 is a series of elongate parallel slots 16. An integral elongate rib 17 is disposed between certain slots 16 and provides one of the locator devices hereinafter described. The slots 16 afford the inlet of air to the interior of the case 10 from the outside. In the upper portion of the casing 10, somewhat opposite to the inlet slots 16, are parallel spaced outlet slots 18, arranged in two sets of three, each set slightly spaced from the other, as shown.

In the upper portion of the inside of the casing 10 is a row of integral molded tines or pins 19, which are parallel to each other and substantially spaced apart, thereby to afford a relatively free and unrestricted stream of air to pass from the inlet ports 16 to the outlet ports 18. Most of the tines 18 project close to the open end of the casing and thus provide a shelf for supporting a chemically treated tablet, indicated at T. One of the tines is substantially shorter than the others in order to accommodate a portion of the electrical connection for an internal wire. A small lamp bulb 20 is neon-operated, is arranged adjacent the heater 14, and is suitably connected in the circuit. Thus, a tablet T inserted through the opening 15 in the casing member 11 rests freely on the shelf formed by the tines 19. The spacing of the tines is generous, but not sufficient to enable the tablet to drop between the tines to the lower chamber of the casing. Thus, not only do the tines or pins 19 provide a much simpler tablet-supporting shelf, but also provide a shelf which enables a freer flow of air about the tablet so that the heated air can effect more efficient diffusion of the tablet.

Figure 2:
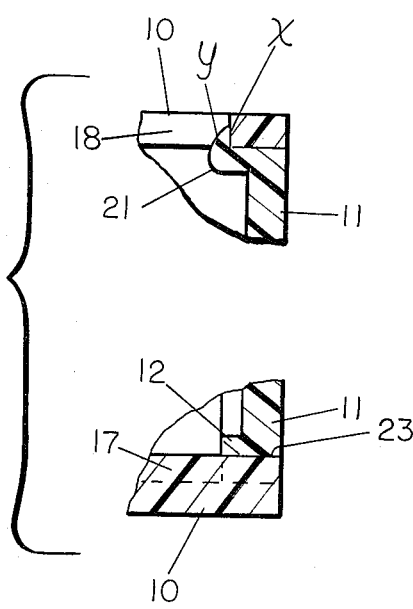
FIG. 2 is an enlarged fragmentary sectional view of the assembled parts showing a spring hook on the cover plate and the cooperating locator devices.

For connecting the cover plate 11 to the casing 10, there are four similar hooks, which are integral with the plate on which they are molded. There are two laterally spaced upper hooks 21 and two laterally spaced lower hooks 22. Each of these hooks, as shown on FIG. 2, have right angular hooking edge $x$ and an adjacent cam-like chamfered surface $y$.

In use, the cover plate 11 is slightly tilted to enable the upper hooks 21 to engage the adjacent edges of the outer most holes 18. Then the lower portion of the plate 11 is pressed in to cause the hooks 22 to flex by engagement of surface $y$ and enter the outermost holes 16 to engage the edges thereof. Inward movement of the plate toward the dome-like end of the casing 10 is prevented by engagement with the ends of the tines 19. Thus, the tines 19 limit the movement of the cover plate in one direction, and the hooks 21 and 22 positively prevent outward movement so that the plate is firmly held in a position flush to the rim of the casing.

To insure that the cover plate is properly applied to the casing 10, a transverse groove 23 in the outer side of the plate flange 12, slides over the rib 17 when the plate is pressed into engagement with the casing.

As explained in the referenced patents, the tablet T is a volatile, or air diffusible substance of the character for the air treatment which the vaporizer is intended to accomplish, and this may be of a deodorizer, perfuming or germicidal nature.

Numerous changes may be made within the scope of the following claims without departing from the spirit of the invention. The specification and drawings should be read as illustrative of a practical embodiment and not in a limiting sense.

What I claim is:

1. In a vaporizer device designed to be plugged into an electrical wall outlet having a hollow casing in which there is a lower chamber and an upper chamber, therebeing air inlet port means in the lower chamber and air outlet port means in the upper chamber, and a back casing member having a resistance-type electrical heating element extending into the lower chamber, the improvement which comprises 1. a row of laterally close spaced parallel pins or tines integral with the projecting from the front of the casing toward the back casing member and disposed above the heating elements, said pins providing a support for a chemically treated diffusable tablet, and spaced from each other to afford a free air passage so that an air stream induced by the heating element flows through the air inlet port means about a chemically treated tablet and out from the casing through the air outlet port means, 2. the outer ends of said tines being free and so disposed as to limit the inward movement of the back casing member, and 3. means for preventing outward movement of the back casing member.

2. In a vaporizer device as claimed in claim 1, comprising flexible hooks on said back casing member adapted to hook against the edges of said air port means for retaining said member against outward movement from said casing.

* * * * *